United States Patent
Bae et al.

(10) Patent No.: US 10,354,802 B1
(45) Date of Patent: Jul. 16, 2019

(54) CERAMIC ELECTRONIC COMPONENT

(71) Applicant: SAMSUNG ELECTRO-MECHANICS CO., LTD., Suwon-si, Gyeonggi-do (KR)

(72) Inventors: Bum Chul Bae, Suwon-si (KR); Woo Chul Shin, Suwon-si (KR); Sang Soo Park, Suwon-si (KR); Ki Won Kim, Suwon-si (KR); Dong Hwi Shin, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 16/195,662

(22) Filed: Nov. 19, 2018

(30) Foreign Application Priority Data

Sep. 18, 2018 (KR) .......... 10-2018-0111283

(51) Int. Cl.
| | |
|---|---|
| *B32B 15/04* | (2006.01) |
| *H01G 4/008* | (2006.01) |
| *H01G 4/30* | (2006.01) |
| *H01G 4/12* | (2006.01) |
| *H01G 2/12* | (2006.01) |
| *H01G 2/00* | (2006.01) |

(52) U.S. Cl.
CPC .............. *H01G 4/30* (2013.01); *H01G 4/008* (2013.01); *H01G 4/1227* (2013.01); *H01G 2/00* (2013.01); *H01G 2/12* (2013.01); *Y10T 428/12576* (2015.01); *Y10T 428/12715* (2015.01); *Y10T 428/12722* (2015.01); *Y10T 428/12944* (2015.01)

(58) Field of Classification Search
None
See application file for complete search history.

(56) References Cited

U.S. PATENT DOCUMENTS 8,988,854 B1 * 3/2015 Zenzai .................. H01G 4/30
361/301.4
9,099,250 B2 * 8/2015 Chae ..................... H01G 4/30
(Continued)

FOREIGN PATENT DOCUMENTS

| JP | H06196351 | * | 7/1994 | ............... H01G 4/12 |
| JP | 2014-220324 A | | 11/2014 | |
| JP | 2014-241453 A | | 12/2014 | |

*Primary Examiner* — Seth Dumbris
(74) *Attorney, Agent, or Firm* — Morgan Lewis & Bockius LLP (57) ABSTRACT

A ceramic electronic component includes a body including dielectric layers and a plurality of internal electrodes disposed to face each other while having each of the dielectric layers interposed therebetween; and external electrodes including a connection portion disposed on end surfaces of the body opposing each other and band portions extending onto portions of upper and lower surfaces of the body from the connection portion, wherein the external electrodes include electrode layers connected to the plurality of internal electrodes, conductive resin layers disposed on the electrode layers, Ni plating layers disposed on the conductive resin layers, and Sn plating layers disposed on the Ni plating layers, and tc1 is 0.5 μm or more and tc2/tc1 is 1.2 or less, in which a thickness of the Ni plating layer in the connection portion is "tc1" and a thickness of the Ni plating layer in the band portion is tc2.

15 Claims, 5 Drawing Sheets

(56) References Cited

U.S. PATENT DOCUMENTS

2015/0053472 A1* 2/2015 Lee .................. H05K 1/185
  174/260
2016/0093442 A1   3/2016 Nagamoto
2017/0301468 A1* 10/2017 Kim .................. H01G 4/30

* cited by examiner

CERAMIC ELECTRONIC COMPONENT

CROSS-REFERENCE TO RELATED APPLICATION(S)

This application claims the benefit of priority to Korean Patent Application No. 10-2018-0111283 filed on Sep. 18, 2018 in the Korean Intellectual Property Office, the disclosure of which is incorporated herein by reference in its entirety.

TECHNICAL FIELD

The present disclosure relates to a ceramic electronic component.

BACKGROUND

A multilayer ceramic capacitor, a ceramic electronic component, is a chip-type condenser mounted on the printed circuit boards of several types of electronic products, such as an image display apparatus, for example, a liquid crystal display (LCD), a plasma display panel (PDP), or the like, a computer, a smartphone, a cellular phone, or the like, to serve to charge electricity therein or discharge electricity therefrom.

The multilayer ceramic capacitor may be used as a component of various electronic apparatuses due to advantages thereof, such as small size, high capacitance, and ease of mounting. As various electronic devices such as computers, mobile devices, and the like are miniaturized and have a high output, demand for miniaturization and high capacitance in multilayer ceramic capacitors has increased.

Meanwhile, as industry interest in electrical components has recently increased, multilayer ceramic capacitors have also been required to have high reliability and high strength characteristics in order to be used in an automobile or infotainment system.

In particular, since high flexural strength characteristics are required for the multilayer ceramic capacitor, an improvement is required in internal and external structures for improving flexural characteristics.

SUMMARY

An aspect of the present disclosure may provide a ceramic electronic component having excellent reliability.

According to an aspect of the present disclosure, a ceramic electronic component may include a body including dielectric layers and a plurality of internal electrodes disposed to face each other while having each of the dielectric layers interposed therebetween, and including first and second surfaces opposing each other, third and fourth surfaces opposing each other and connecting the first and second surfaces, and fifth and sixth surfaces opposing each other and connecting the first to fourth surfaces; and external electrodes each including a connection portion disposed on the third surface or the fourth surface of the body and band portions extending onto portions of the first and second surfaces of the body from the connection portion. The external electrodes each include at least one electrode layer electrically connected to the plurality of internal electrodes, at least one conductive resin layer disposed on the at least one electrode layer, at least one Ni plating layer disposed on the at least one conductive resin layer, and at least one Sn plating layer disposed on the at least one Ni plating layers, and tc1 is 0.5 μm or more and tc2/tc1 is 1.2 or less, in which a thickness of the at least one Ni plating layer in the connection portion is tc1 and a thickness of the at least one Ni plating layer in the band portions is tc2.

According to another aspect of the present disclosure, a ceramic electronic component may include a body including dielectric layers and a plurality of internal electrodes stacked in a stacking direction while having each of the dielectric layers interposed therebetween; and external electrodes including a connection portion disposed on end surfaces of the body opposing each other in a length direction of the body and electrically connected to the plurality of internal electrodes, and band portions extending in the length direction so as to cover portions of upper and lower surfaces of the body in the stacking direction. the external electrodes each include at least one electrode layer electrically connected to the plurality of internal electrodes, at least one conductive resin layer disposed on the at least one electrode layer, at least one Ni plating layer disposed on the at least one conductive resin layer, and at least one Sn plating layer disposed on the at least one Ni plating layer, and tc1 is 0.5 μm or more and tc2/tc1 is 1.2 or less, in which a thickness of the at least one Ni plating layer in the connection portion is "tc1" and a thickness of the at least one Ni plating layer in the band portions is "tc2".

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

In the drawings, an X direction refers to a second direction, an L direction, or a length direction, a Y direction refers to a third direction, a W direction, or a width direction, and a Z direction refers to a first direction, a stacked direction, a T direction, or a thickness direction.

Ceramic Electronic Component

Figure 1:
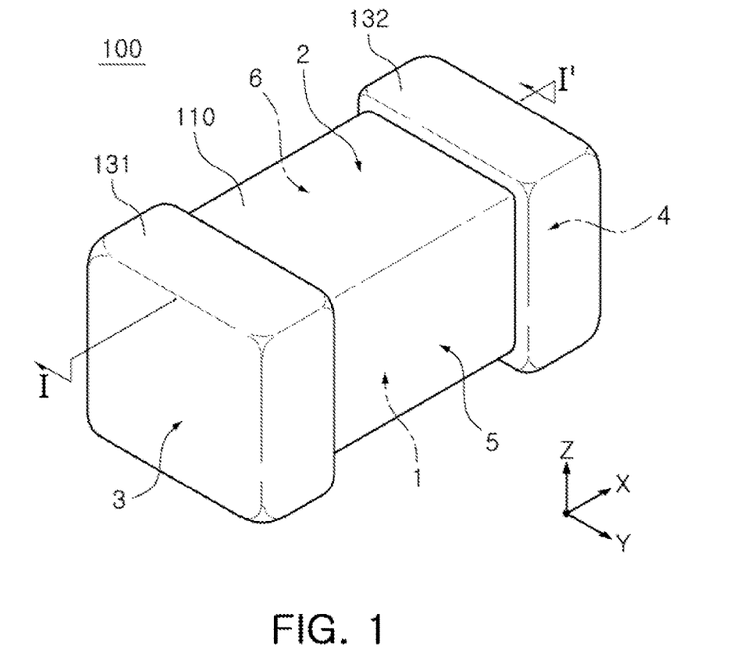
FIG. 1 is a perspective view schematically illustrating a ceramic electronic component according to an exemplary embodiment in the present disclosure.

FIG. 1 is a perspective view schematically illustrating a ceramic electronic component according to an exemplary embodiment in the present disclosure.

Figure 2:
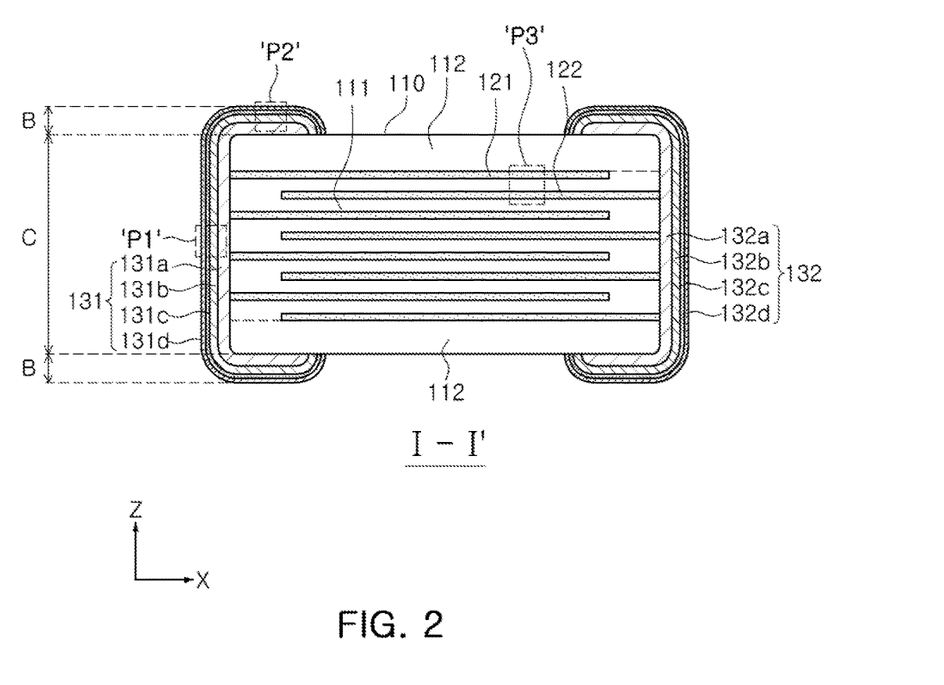
FIG. 2 is a schematic cross-sectional view taken along line I-I' of FIG. 1.

FIG. 2 is a schematic cross-sectional view taken along line I-I' of FIG. 1.

Figure 3A:
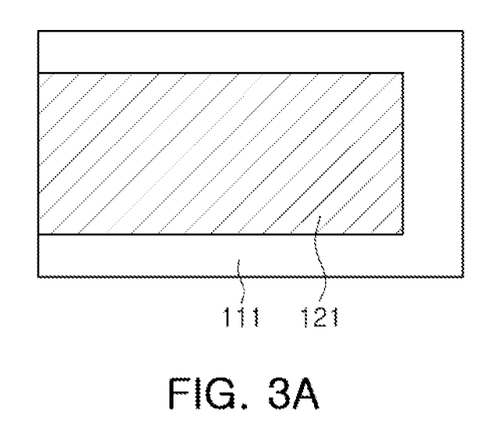
FIG. 3A illustrates a ceramic green sheet on which a first internal electrode is printed and FIG. 3B illustrates a ceramic green sheet on which a second internal electrode is printed.
Figure 3B:
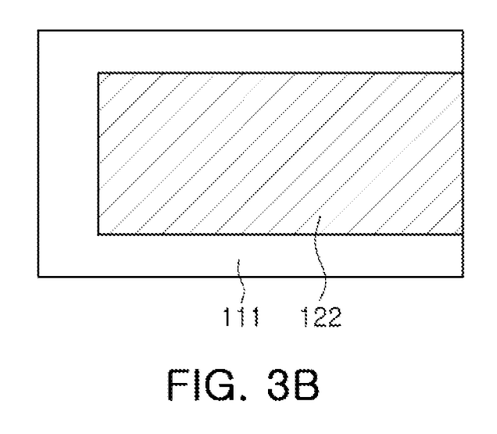

FIG. 3A illustrates a ceramic green sheet on which a first internal electrode is printed and FIG. 3B illustrates a ceramic green sheet on which a second internal electrode is printed.

Figure 4:
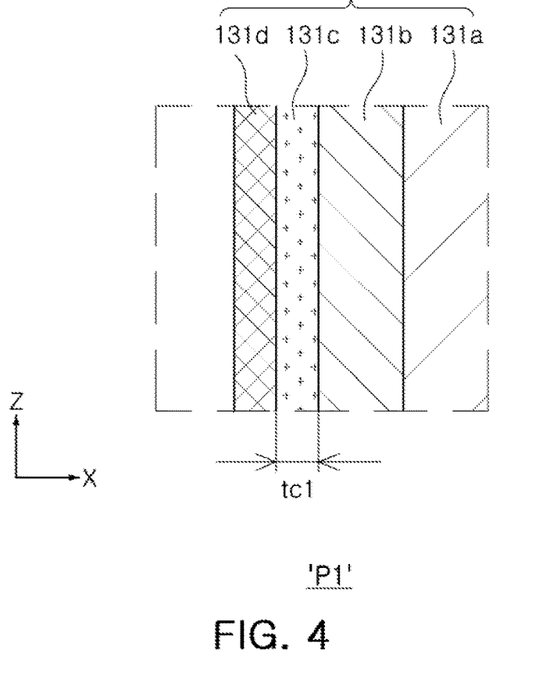
FIG. 4 is an enlarged view of region P1 of FIG. 2.

FIG. 4 is an enlarged view of region P1 of FIG. 2.

Figure 5:
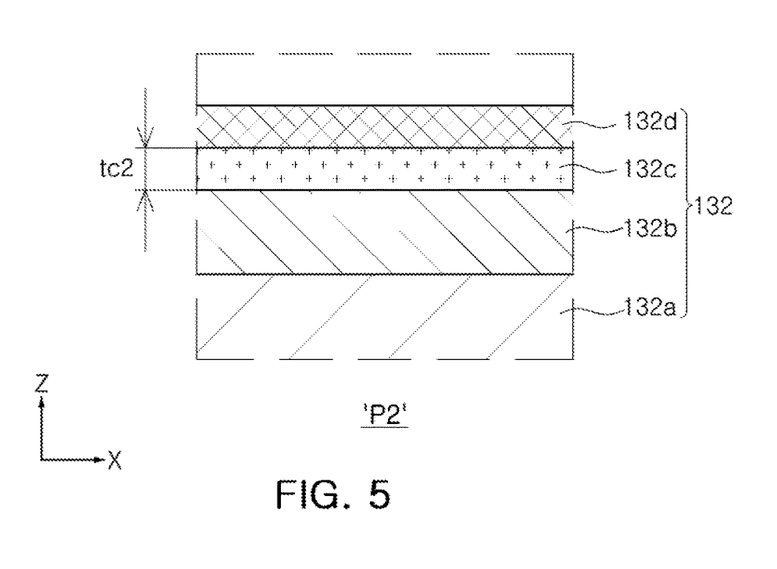
FIG. 5 is an enlarged view of region P2 of FIG. 2.

FIG. 5 is an enlarged view of region P2 of FIG. 2.

Figure 6:
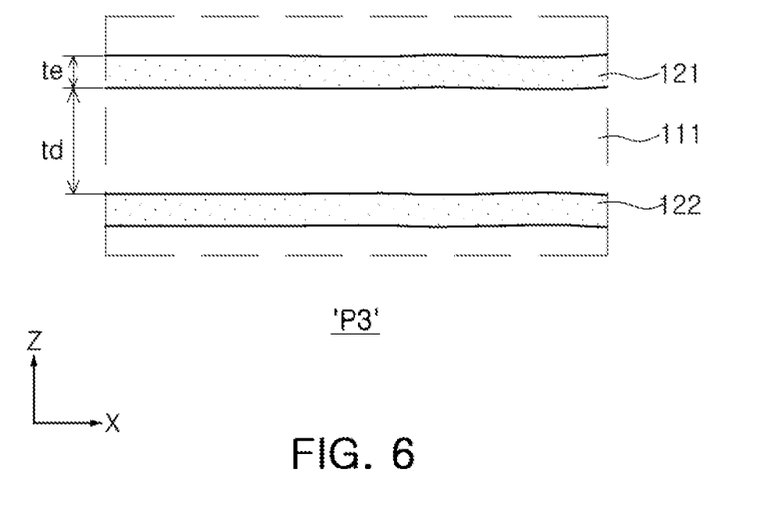
FIG. 6 is an enlarged view of region P3 of FIG. 2.

FIG. 6 is an enlarged view of region P3 of FIG. 2.

Referring to FIGS. 1 through 6, a ceramic electronic component 100 according to an exemplary embodiment in the present disclosure may include a body 110 including dielectric layers 111 and a plurality of internal electrodes 121 and 122 disposed to face each other while having each of the dielectric layers 111 interposed therebetween, and including first and second surfaces 1 and 2 opposing each other, third and fourth surfaces 3 and 4 connecting the first and second surfaces and opposing each other, and fifth and sixth surfaces 5 and 6 connected to the first to fourth surfaces and opposing each other; and external electrodes 131 and 132 including a connection portion C disposed on the third surface 3 or the fourth surface 4 of the body 110 and band portions B extending to portions of the first and second surfaces 1 and 2 of the body 110 from the connection portion C, wherein the external electrodes 131 and 132 each include electrode layers 131a and 132a connected to the internal electrodes 121 and 122, conductive resin layers 131b and 132b disposed on the electrode layers 131a and 132a, Ni plating layers 131c and 132c disposed on the conductive resin layers 131b and 132b, and Sn plating layers 131d and 132d disposed on the Ni plating layers 131c and 132c, and tc1 is 0.5 μm or more and tc2/tc1 is 1.2 or less, in which a thickness of the Ni plating layer 131c or 132c in the connection portion C is "tc1" and a thickness of the Ni plating layer 131c or 132c in the band portion B is "tc2".

A ceramic electronic component according to an exemplary embodiment in the present disclosure, particularly, a multilayer ceramic capacitor will hereinafter be described. However, the ceramic electronic component according to the present disclosure is not limited thereto.

In the body 110, the dielectric layers 111 and the internal electrodes 121 and 122 may be alternately stacked.

A specific shape of the body 110 is not particularly limited, but the body 110 may be formed in a hexahedral shape as illustrated or a shape similar thereto. Due to the shrinkage of ceramic powders contained in the body 110 during a sintering process, the body 110 may have a substantially hexahedral shape, although it is not a hexahedral shape with a complete straight line.

The body 110 may have the first and second surfaces 1 and 2 opposing each other in a thickness direction (Z direction) thereof (or a stacking direction), third and fourth surfaces 3 and 4 connecting the first and second surfaces 1 and 2 and opposing each other in a length direction (X direction) thereof, and fifth and sixth surfaces 5 and 6 connecting the first and second surfaces 1 and 2, connected to the third and fourth surfaces 3 and 4, and opposing each other in a width direction (Y direction) thereof.

The plurality of dielectric layers 111 forming the body 110 may be in a sintered state, and adjacent dielectric layers 111 may be integrated with each other so that boundaries therebetween are not readily apparent without using a scanning electron microscope (SEM).

According to an exemplary embodiment in the present disclosure, a raw material of the dielectric layer ill is not particularly limited as long as it may obtain a sufficient capacitance. For example, a barium titanate-based material, a lead composite perovskite-based material, a strontium titanate-based material, or the like may be used.

The material of the dielectric layer 111 may be prepared by adding various ceramic additives, organic solvents, plasticizers, binders, dispersing agents, and the like, to a powder such as barium titanate ($BaTiO_3$) powder, or the like, according to an object of the present disclosure.

The plurality of internal electrodes 121 and 122 may be disposed to face each other while having the dielectric layer 111 interposed therebetween.

The internal electrodes 121 and 122 may include first and second internal electrodes 121 and 122 alternately disposed to face each other while having each of the dielectric layers 111 interposed therebetween.

The first and second internal electrodes 121 and 122 may be exposed through the third and fourth surfaces 3 and 4 of the body 110, respectively.

Referring to FIGS. 1 and 2, the first internal electrode 121 may be spaced apart from the fourth surface 4 of the body 110 and exposed through the third surface 3 of the body 110, and the second internal electrode 122 may be spaced apart from the third surface 3 of the body 110 and exposed through the fourth surface 4 of the body 110. The first external electrode 131 may be disposed on the third surface 3 of the body and electrically connected to the first internal electrode 121, and the second external electrode 132 may be disposed on the fourth surface 4 of the body and electrically connected to the second internal electrode 122.

At this time, the first and second internal electrodes 121 and 122 may be electrically separated from each other by the dielectric layer 111 disposed therebetween. Referring to FIGS. 3A and 3B, the body 110 may be formed by alternatively stacking a ceramic green sheet (a) on which the first internal electrode 121 is printed and a ceramic green sheet (b) on which the second internal electrode 122 is printed in a thickness direction (Z direction) and then sintering the ceramic green sheets (a and b).

A material forming each of the first and second internal electrodes 121 and 122 is not particularly limited, but may be a conductive paste formed of one or more of, for example, a noble metal material such as palladium (Pd), a palladium-silver (Pd—Ag) alloy, or the like, nickel (Ni), and copper (Cu).

A method of printing the conductive paste may be a screen printing method, a gravure printing method, or the like, but is not limited thereto.

In this case, the ceramic electronic component 100 according to an exemplary embodiment in the present disclosure may include a capacitance forming portion disposed in the body 110 and forming a capacitance by including the first and second internal electrodes 121 and 122 disposed to face each other while having the dielectric layer 111 interposed therebetween, and cover portions 112 formed on upper and lower surfaces of the capacitance forming portion.

The cover portions 112 may not include the internal electrodes 121 and 122 and may be formed of the same material of that of the dielectric layer 111. That is, the cover portions 112 may be formed of a ceramic material, for example, a barium titanate-based material, a lead composite perovskite-based material, a strontium titanate-based material, or the like.

The cover portions 112 may be formed by stacking a single dielectric layer or two or more dielectric layers on the upper and lower surfaces of the capacitance forming portion, respectively, in a vertical direction, and may basically serve to prevent damage to the internal electrodes due to physical or chemical stress.

The ceramic electronic component 100 according to an exemplary embodiment in the present disclosure may include the external electrodes 131 and 132 including the connection portion C disposed on the third surface 3 or the fourth surface 4 of the body 110 and the band portions B extending to the portions of the first and second surfaces 1 and 2 from the connection portion C.

In this case, the band portions B may extend not only to the portions of the first and second surfaces 1 and 2, but also to portions of the fifth and sixth surfaces 5 and 6 from the connection portion C.

The external electrodes 131 and 132 may include a first external electrode 131 in which the connection portion C is disposed on the third surface 3 of the body 110, and a second external electrode 132 in which the connection portion C is disposed on the fourth surface 4 of the body 110.

The first and second external electrodes 131 and 132 may be electrically connected to the first and second internal electrodes 121 and 122, respectively, for capacitance formation, and the second external electrode 132 may be connected to a potential different from that of the first external electrode 131.

Hereinafter, the first external electrode 131 will be mainly described, but the description may also be applied to the second external electrode 132 in a similar way.

The external electrodes 131 and 132 may include the electrode layers 131a and 132a electrically connected to the internal electrodes 121 and 122, the conductive resin layers 131b and 132b disposed on the electrode layers 131a and 132a, the Ni plating layers 131c and 132c disposed on the conductive resin layers 131b and 132b, and the Sn plating layers 131d and 132d disposed on the Ni plating layers 131c and 132c.

The electrode layers 131a and 132a may include a conductive metal and glass.

The conductive metal used for the electrode layers 131a and 132a is not particularly limited as long as it is a material that may be electrically connected to the internal electrode for the capacitance formation. For example, the conductive metal may be one or more selected from the group consisting of copper (Cu), silver (Ag), nickel (Ni), and alloys thereof.

The electrode layers 131a and 132a may be formed by applying a conductive paste prepared by adding glass frit to the conductive metal powder and then sintering the conductive paste.

The conductive resin layers 131b and 132b may be formed on the electrode layers 131a and 132a, and may fully cover the electrode layers 131a and 132a.

The conductive resin layers 131b and 132b may include a conductive metal and a base resin.

The base resin included in the conductive resin layers 131b and 132b is not particularly limited as long as it has bonding property and impact absorbability and may be mixed with the conductive metal powder to form the paste. For example, the base resin may include an epoxy-based resin.

The conductive metal included in the conductive resin layers 131b and 132b is not particularly limited as long as it is a material that may be electrically connected to the electrode layers 131a and 132a. For example, the conductive metal may include one or more selected from the group consisting of copper (Cu), silver (Ag), nickel (Ni), and alloys thereof.

The Ni plating layers 131c and 132c may be formed on the conductive resin layers 131b and 132b and may fully cover the conductive resin layers 131b and 132b.

FIG. 4 is an enlarged view of region P1 of FIG. 2.

FIG. 5 is an enlarged view of region P2 of FIG. 2.

Referring to FIGS. 4 and 5, in the ceramic electronic component according to an exemplary embodiment in the present disclosure, tc1 may be 0.5 μm or more and tc2/tc1 may be 1.2 or less, in which a thickness of the Ni plating layer 131c or 132c in the connection portion C is tc1 and a thickness of the Ni plating layer 131c or 132c in the band portion B is tc2.

When the thickness tc1 of the Ni plating layer 131c or 132c in the connection portion C is less than 0.5 μm, it may be difficult to secure solderability.

In a case in which tc2/tc1 exceeds 1.2, since a difference in stress between the connecting portion C and the band portion B becomes too large, a flexural strength may be lowered and an occurrence frequency of a flexural crack may be increased.

The flexural strength of 5 mm or more may be secured by adjusting tc2/tc1 to 1.2 or less.

In this case, tc2/tc1 may be greater than 1.0 and be 1.2 or less.

The solderability may be further improved by adjusting the thickness tc2 of the Ni plating layer 131c or 132c in the band portion B to be thicker than the thickness tc1 of the Ni plating layer 131c or 132c in the connection portion C, that is, by adjusting tc2/tc1 to be greater than 1.0.

The thickness tc1 of the Ni plating layer 131c or 132c in the connection portion C may be measured at a central portion of the connection portion C, and the thickness tc2 of the Ni plating layer 131c or 132c in the band portion may be measured at a central portion of the band portion B.

The Sn plating layers 131d and 132d may be formed on the Ni plating layers 131c and 132c and may fully cover the Ni plating layers 132c and 132c.

The Sn plating layers 131d and 132d may serve to improve mounting characteristics.

FIG. 6 is an enlarged view of region P3 of FIG. 2.

Referring to FIG. 6, in the ceramic electronic component according to an exemplary embodiment in the present disclosure, td>2*te in which td may be a thickness of the dielectric layer 111 and te may be a thickness of each of the internal electrodes 121 and 122.

That is, according to an exemplary embodiment in the present disclosure, the thickness td of the dielectric layer 111 may be greater than twice the thickness te of each of the internal electrodes 121 and 122.

In general, reliability problems due to lowering of a breakdown voltage in a high voltage environment may be a major issue in high voltage electric parts.

In the multilayer ceramic capacitor according to an exemplary embodiment in the present disclosure, in order to prevent the lowering of the breakdown voltage in the high voltage environment, the thickness td of the dielectric layer 111 is greater than twice the thickness te each of the internal electrodes 121 and 122 to thereby increase the thickness of the dielectric layer 111, which is a distance between the internal electrodes 121 and 122, such that breakdown voltage characteristics may be improved.

When the thickness td of the dielectric layers 111 is twice or less of the thickness te of each of the internal electrodes 121 and 122, the dielectric breakdown voltage may be lowered because the thickness of the dielectric layer 111, which is the distance between the internal electrodes 121 and 122, is thin.

The thickness te of each of the internal electrodes 121 and 122 may be less than 1 μm and the thickness td of the dielectric layer 111 may be less than 2.8 μm, but are not necessarily limited thereto.

Table 1 below illustrates an evaluation of solderability and flexural strength according to the thickness tc1 of the Ni plating layer 131c or 132c of the connection portion C and the thickness tc2 of the Ni plating layer 131c or 132c of the band portion B.

tc1 and tc2 are measured at the central portions of the connection portion C and the band portion B, respectively.

When the external electrodes 131 and 132 of samples of the multilayer ceramic capacitor are dipped in solder, the solderability was indicated by '0' in case in which 95% or more of the area of the external electrodes 131 and 132 is covered by the solder, and was indicated by 'X' in a case in which the area of the external electrodes 131 and 132 which is less than 95% is covered by the solder.

When the samples of the multilayer ceramic capacitor were mounted on the substrate and the distance from the central portion pressed by bending was set to 5 mm to observe whether or not a crack occurred, the flexural strength was indicated by 'o' when no crack occurred and was indicated by 'X' when a crack occurred.

TABLE 1

| Sample Nos. | tc1 | tc2 | tc2/tc1 | Solderability | Flexural Strength |
|---|---|---|---|---|---|
| 1 | 0.5 | 0.4 | 0.80 | o | o |
| 2 | 1.0 | 0.8 | 0.80 | o | o |
| 3 | 1.5 | 1.5 | 1.00 | o | o |
| 4 | 2.0 | 2.0 | 1.00 | o | o |
| 5 | 2.5 | 2.4 | 0.96 | o | o |
| 6 | 3.0 | 3.1 | 1.03 | o | o |
| 7 | 3.5 | 3.4 | 0.97 | o | o |
| 8 | 4.0 | 4.2 | 1.05 | o | o |
| 9 | 4.5 | 4.9 | 1.09 | o | o |
| 10 | 5.0 | 5.7 | 1.14 | o | o |
| 11* | 5.5 | 6.7 | 1.22 | o | x |
| 12* | 6.0 | 8.0 | 1.33 | o | x |
| 13* | 6.5 | 8.8 | 1.35 | o | x |
| 14* | 7.0 | 9.1 | 1.30 | o | x |
| 15* | 7.5 | 10.7 | 1.43 | o | x |
| 16* | 8.0 | 12.3 | 1.54 | o | x |
| 17* | 8.5 | 13.3 | 1.56 | o | x |
| 18* | 9.0 | 15.0 | 1.67 | o | x |
| 19* | 9.5 | 16.5 | 1.74 | o | x |
| 20* | 10.0 | 17.8 | 1.78 | o | x |

Referring to Table 1, it may be confirmed that Sample Nos. 1 to 10 having tc1 of 0.5 μm or more and tc2/tc1 of 1.2 or less according to an exemplary embodiment in the present disclosure are excellent in the solderability and the flexural strength characteristics.

On the other hand, in the case of Sample Nos. 11 to 20, since tc1 is 0.5 μm or more, solderability was excellent. However, since tc2/tc1 exceeded 1.2, a stress difference between the connecting portion C and the band portion B is too large, which causes the flexural crack. As a result, the flexural strength characteristics were lowered.

As set forth above, according to the exemplary embodiment in the present disclosure, solderability may be secured by adjusting the thickness of the Ni plating layer in the connection portion of the external electrode, and the flexural strength may be improved by adjusting the ratio of the thickness of the Ni plating layer in the connection portion of the external electrode and the thickness of the Ni plating layer in the band portion of the external electrode, thereby improving reliability.

Various advantages and effects of the present disclosure are not limited to the description above, and may be more readily understood in the description of exemplary embodiments in the present disclosure.

While exemplary embodiments have been shown and described above, it will be apparent to those skilled in the art that modifications and variations could be made without departing from the scope of the present invention as defined by the appended claims.

What is claimed is:

1. A ceramic electronic component comprising:
a body including dielectric layers and a plurality of internal electrodes disposed to face each other while having each of the dielectric layers interposed therebetween, and including first and second surfaces opposing each other, third and fourth surfaces opposing each other and connecting the first and second surfaces, and fifth and sixth surfaces opposing each other and connecting the first to fourth surfaces; and
external electrodes each including a connection portion disposed on the third surface or the fourth surface of the body and band portions extending onto portions of the first and second surfaces of the body from the connection portion,
wherein the external electrodes each include at least one electrode layer electrically connected to the plurality of internal electrodes, at least one conductive resin layer disposed on the at least one electrode layer, at least one Ni plating layer disposed on the at least one conductive resin layer, and at least one Sn plating layer disposed on the at least one Ni plating layer, and
tc1 is 0.5 μm or more and tc2/tc1 is 1.2 or less, in which a thickness of the at least one Ni plating layer in the connection portion is "tc1" and a thickness of the at least one Ni plating layer in the band portions is "tc2".

2. The ceramic electronic component of claim 1, wherein tc2/tc1 is greater than 1.0 and is 1.2 or less.

3. The ceramic electronic component of claim 1, wherein a thickness of each of the plurality of internal electrodes is less than 1 μm.

4. The ceramic electronic component of claim 1, wherein a thickness of each of the dielectric layers is less than 2.8 μm.

5. The ceramic electronic component of claim 1, wherein td>2*te, in which a thickness of each of the plurality of internal electrodes is "te" and a thickness of each of the dielectric layers is "td".

6. The ceramic electronic component of claim 1, wherein the at least one electrode layer includes one or more conductive metals selected from a group consisting of copper (Cu), silver (Ag), nickel (Ni), and alloys thereof, and glass.

7. The ceramic electronic component of claim 1, wherein the at least one conductive resin layer includes one or more conductive metals selected from a group consisting of copper (Cu), silver (Ag), nickel (Ni), and alloys thereof, and a base resin.

8. A ceramic electronic component comprising:
a body including dielectric layers and a plurality of internal electrodes stacked in a stacking direction while having each of the dielectric layers interposed therebetween; and
external electrodes including a connection portion disposed on end surfaces of the body opposing each other in a length direction of the body and electrically connected to the plurality of internal electrodes, and band portions extending in the length direction so as to cover portions of upper and lower surfaces of the body in the stacking direction,
wherein the external electrodes each include at least one electrode layer electrically connected to the plurality of internal electrodes, at least one conductive resin layer disposed on the at least one electrode layer, at least one Ni plating layer disposed on the at least one conductive resin layer, and at least one Sn plating layer disposed on the at least one Ni plating layer, and tc1 is 0.5 μm or more and tc2/tc1 is 1.2 or less, in which a thickness of the at least one Ni plating layer in the connection portion is "tc1" and a thickness of the at least one Ni plating layer in the band portions is "tc2".

9. The ceramic electronic component of claim 8, wherein the body comprises first and second surfaces opposing each other in the stacking direction, third and fourth surfaces opposing each other in the length direction and connecting the first and second surfaces, and fifth and sixth surfaces opposing each other in a width direction, orthogonal to the stacking and length directions and connecting the first to fourth surfaces.

10. The ceramic electronic component of claim 8, wherein tc2/tc1 is greater than 1.0 and is 1.2 or less.

11. The ceramic electronic component of claim 8, wherein a thickness of each of the plurality of internal electrodes is less than 1 μm.

12. The ceramic electronic component of claim 8, wherein a thickness of each of the dielectric layers is less than 2.8 μm.

13. The ceramic electronic component of claim 8, wherein td>2*te, in which a thickness of each of the plurality of internal electrodes is "te" and a thickness of each of the dielectric layers is "td".

14. The ceramic electronic component of claim 8, wherein the at least one electrode layer includes one or more conductive metals selected from a group consisting of copper (Cu), silver (Ag), nickel (Ni), and alloys thereof, and glass.

15. The ceramic electronic component of claim 8, wherein the at least one conductive resin layer includes one or more conductive metals selected from a group consisting of copper (Cu), silver (Ag), nickel (Ni), and alloys thereof, and a base resin.

* * * * *